June 3, 1924.  1,496,226
C. H. INGWER
SHOE HEEL
Filed Aug. 7, 1923
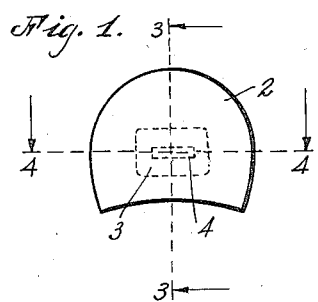
Fig. 1.
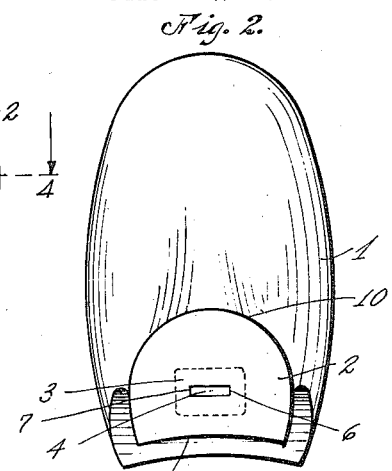
Fig. 2.
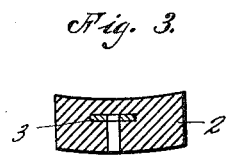
Fig. 3.
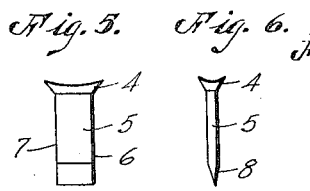
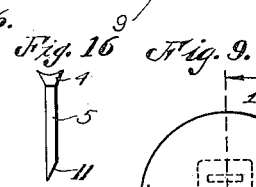
Fig. 5. Fig. 6. Fig. 16. Fig. 9.
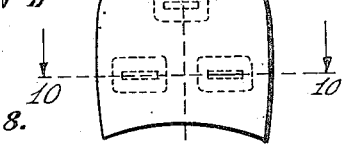
Fig. 4.
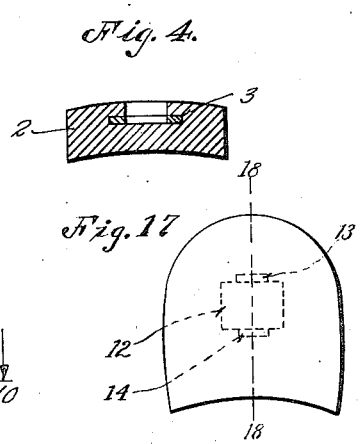
Fig. 17.
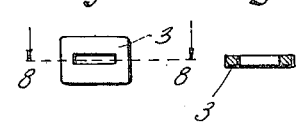
Fig. 7. Fig. 8.
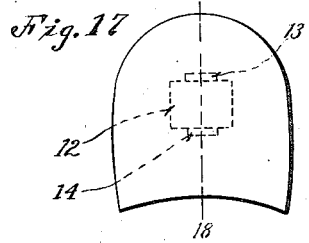
Fig. 10.
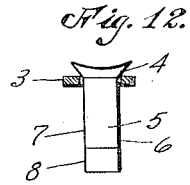
Fig. 12.
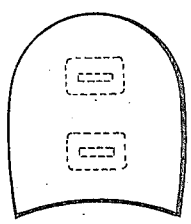
Fig. 13.
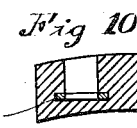
Fig. 11. Fig. 18.
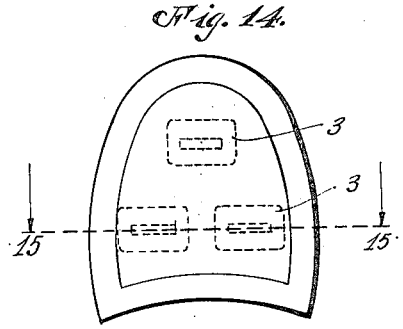
Fig. 14.
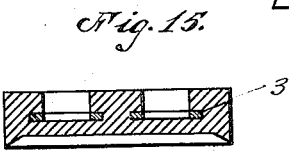
Fig. 15.
INVENTOR
Carl. H. Ingwer
BY
Richey Slough + Watts
HIS ATTORNEYS Patented June 3, 1924.

1,496,226

UNITED STATES PATENT OFFICE.

CARL H. INGWER, OF ELYRIA, OHIO, ASSIGNOR TO THE I. T. S. RUBBER COMPANY, OF ELYRIA, OHIO, A CORPORATION OF OHIO.

SHOE HEEL.

Application filed August 7, 1923. Serial No. 656,189.

*To all whom it may concern:*

Be it known that I, CARL H. INGWER, a citizen of the United States, residing at Elyria, in the county of Lorain and State of Ohio, have invented certain new and useful Improvements in Shoe Heels, of which the following is a specification.

My invention relates to shoe heels, and more particularly to shoe heels composed partly of wood or the like, and partly of a resilient material such as rubber or rubber composition.

The advantage of heels constructed partly of wood and partly of rubber are well known, but the difficulties of forming a composite structure of these substances which will not cause the disfigurement, the injury or destruction of the wooden part of the heel are well known. Indeed, they have been so formidable as to practically defeat the successful production and use of such heels.

One of the objects of my invention is to produce a heel whose upper part is made of wood and whose tread part is made of rubber, the two parts being connected together in such a way that the wood portion of the heel is not endangered either during the attachment or during use. There is thus produced a heel which is light and whose tread face is soft and resilient. Such heels are of particular advantage for women's shoes where the heels are relatively large and such materials as are used in shoes of other types would weight a woman's shoe excessively.

These and other objects of my invention, as well as the invention itself, will be well understood by reference to the following description of certain embodiments of my invention as illustrated in the drawings.

Fig. 1 shows a plan view of a rubber heel which may be employed in connection with my invention, the nail head securing washer in this view being indicated by dotted lines.

Fig. 2 shows a similar plan view of an attached rubber heel, and ladies' shoe heel employing the attaching means of my invention, the same being indicated in dotted lines.

Fig. 3 shows a vertical, longitudinal, medial, inverted sectional view of the rubber heel of Fig. 1 taken on the line 3—3 of Fig. 1.

Fig. 4 is a similar view to that of Fig. 3, being a transverse section of the rubber heel on the line 4—4 of Fig. 1.

Fig. 5 shows the nail of my invention in side elevation.

Fig. 6 shows the nail of Fig. 5 in end elevation.

Fig. 7 shows a top plan view of a washer used in connection with the nail of Figs. 5 and 6.

Fig. 8 is a section of the washer of Fig. 7 taken on the line 8—8 of Fig. 7.

Fig. 9 is a plan view of a larger rubber heel employing three nails with three washers associated therewith to secure such larger rubber heel to the bottom of a larger shoe heel, this view being of the rubber heel unattached, the securing means being indicated by dotted lines.

Fig. 10 is a transverse section on the line 10—10 of the rubber heel of Fig. 9.

Fig. 11 is a section on the line 11—11 of Fig. 9 of the same rubber heel.

Fig. 12 is a view of such a washer as shown in Fig. 8 in section, together with the nail in elevation as shown in Fig. 5, extending through the opening in such washer to illustrate the relative positions of the nail and washer when the nail and washer is holding the rubber heel to a wood shoe heel.

Fig. 13 shows a top plan view of a rubber heel employing two nails and two washers co-operating therewith, the nails and washers being shown in dotted lines.

Fig. 14 shows a plan view from the attaching face side of a rubber heel having a substantially flat face portion extending from the center to near the edges, and having an upwardly extending face portion extending therefrom to the edges to form a bevel or flange at the edges, the securing means for such heel being indicated in dotted lines.

Fig. 15 shows a transverse section of the shoe heel of Fig. 14 on the line 15—15 of Fig. 14.

Fig. 16 shows another form of nail I may employ.

Fig. 17 is a plan view of another embodiment of my invention.

Fig. 18 is a section on the line 18—18 of Fig. 17.

It is important, in the composite shoe heel of my invention, to provide means whereby the nails will be directed as described, so that in no case would a cobbler or other workman be able to readily insert the nails into the heel with the tapered end so disposed that the same will produce a wedging action in directions transverse to the grain of the wood shoe heel portion and which grain extends longitudinally from front to rear of wood shoe heel portions as at present universally constructed.

This I accomplish in an embodiment of my invention here illustrated, first, by making the nail directing channels extending into the rubber lift from the tread face thereof noncircular in transverse sections and of such a shape, in such sections, as to index or cooperate with the shape of the nail in such sections so that the nail is uniformly directed by the channels, that its penetrating edge will be so disposed relative to the grain of the wood that the sharpened sides of the end portion of the nail, forming a cutting edge, will be disposed transversely to the grain of the wood. The other sides will then be so disposed as to penetrate the grained wood but without exerting a lateral wedging action to split the wood along the grain. In alignment with such channels and positioned so that the nail will pass through it, I preferably provide a metal washer or plate which is embedded in the rubber material of the lift, as by molding it therein, and which washer or plate has an opening extending through it and which in some embodiments of my invention, as illustrated, is non-circular in outline, the washer or plate being non-rotatably secured in the rubber lift portion; and the shape of the opening may be, as shown in the embodiments of my invention herein illustrated, such as to insure that the nail will take the proper rotative position relative to the grain of the wood, as above described, that splitting of the wood will not occur. The disposition of the walls of the channel and those of the washer opening may independently perform this function, or the function may be performed as shown, as a result of a combined directing action by both channel and washer opening walls. It will be noted that in the embodiments illustrated, the heads of the nails are formed with a concave impact face adapted to receive the point of a tool for driving the nails and to keep such a tool centered with respect to the axis of the nail.

Referring now to all of the figures in which like parts are indicated by like reference characters, at 1 I show a wood shoe heel to which is secured a rubber heel 2 by means of a washer 3 supporting the head 4 of a nail such as 5 passing through the washer opening and being driven into the shoe heel.

Shoe heels as commonly made of wood and employed in the shoe trade at the present time are so formed that the grain of the wood extends longitudinally of the heel, that is, from front to rear, such being the case since this construction secures a better wearing rear edge.

When round nails such as are now commonly employed to secure rubber heels to shoe heels are driven into such a wood heel, the tapered end of the nail acts as a wedge to force the portions of the wood shoe heel located on either side of the nail to be forced apart causing a cleavage of the wood in the longitudinal direction of the heel. Splitting of the wood is thereby caused and I therefore have provided to secure a rubber heel to a wood heel, a nail which does not have its sides tapered inwardly toward the point, but preferably I make the lateral sides of the nails straight, such sides being shown in Fig. 5 at 6 and 7, and I taper the nail at its point end as shown at 8 only on the sides of the nail which face the breast edge 9, or the rear edge 10 of the heel. Therefore when such a nail as shown in Figs. 5 and 6 is used in connection with a rubber heel to nail it onto a wood shoe heel, I prefer to drive the nail through an elongated washer 3 placed as shown in Fig. 2 so that the tapered sides of the point 8 are on the front and rear edge of the nail, speaking relatively, to the front and rear portions of the shoe heel and the sides 6 and 7 which are not tapered inwardly toward the point, but which in the embodiment herein illustrated and described are straight, that is parallel, are disposed towards the side edges 11 and 12 of the rubber heel. Such a nail has no wedging effect such as will tend to split a longitudinally grained wood shoe heel acting merely as a chisel to cut its way into the shoe heel, any wedging effect being exerted in longitudinal directions forwardly and rearwardly from the nail.

I find that I may freely drive such nails into wood shoe heels without causing a splitting of the wood and that therefore by employing the nails and washers co-operating therewith in connection with rubber heels such as those herein illustrated in Figs. 1 to 4 inclusive and 9 to 11 inclusive wherein the rubber heel is curved in all directions so as to give it a concave attaching face and a convex tread face, such heels may be nailed down tightly to the shoe heel, the nails resisting the unflattening pressure upon the nails exerted by the rubber heel, to make a tight joint at all of the edges of the rubber heel and the wood shoe heel not being split, but remains undamaged and tightly holds the ends of the nails driven therein.

Referring now particularly to the rubber heel shown in Figs. 1 to 4 inclusive, wherein only a single nail is employed, by making the nail greater in that dimension extending between the sides 6 and 7 than in the direction at right angles thereto, extending between the sides 5, the nail resists twisting and therefore prevents the rubber heel through which it passes from being twisted out of position wherein the rubber heel edges fit the wood shoe heel edges. I thus accomplish a double function by the provision of such a nail.

I preferably make the washer such as 3 of such size that it may have a sufficient rubber engaging area so as to securely hold the rubber heel down to the shoe heel, and yet I preferably do not make it so large that it dominates the rubber so as to impair the resilient action thereof in maintaining the edges tight in the manner of a concave-convex heel such as that shown and described in the patent to Tufford Reissue No. 14,049, reissued January 11, 1916.

In Figs. 17 and 18 I show a Tufford rubber heel in which the imbedded washer 12 has integral prongs 13 and 14 with chisel edge ends, oppositely disposed, said prongs taking the place of separate nails. In this embodiment, the rubber heel is pounded down onto the shoe heel to secure it thereto. Although I prefer to use such a rubber heel in connection with my invention, my invention is not limited to such use as I may employ the securing means of my invention to widely differing types of rubber heels.

Having thus described my invention in a specific embodiment, I am aware that numerous and extensive departures may be made from the embodiment herein illustrated and described, without departing from the principle thereof.

I claim:—

1. In a woman's shoe heel, the combination of a main portion made of wood having a relatively small flat bottom, mounted upon a shoe with the grain of the wood running parallel to the longitudinal axis of the shoe, a rubber heel lift attached to the bottom of the wood portion of the heel, said rubber lift being provided with a non-circular nail guiding channel extending from the tread face into the body of the lift and approximately perpendicular to the bottom of the wooden portion of the heel with the rubber lift attached thereto, and a nail having a shank and enlarged head, and its end tapered to cause a meeting of only two opposite sides of the shank to form a cutting end edge, its other sides being substantially non-wedging and its shank and the channel so shaped that the nail may be only readily projected into the channel with its cutting edge disposed transversely to the grain of said wooden heel portion, said nail directed by the channel driven through said rubber lift and into said heel wooden portion until the head of the nail rests in the channel at its bottom to secure the rubber lift to the wooden heel portion by clamping a portion of the rubber lift against the contiguous wood portion flat surface.

2. In a woman's shoe heel, the combination of a main portion made of wood having a relatively small flat bottom, mounted upon a shoe with the grain of the wood running parallel to the longitudinal axis of the shoe, a rubber heel lift attached to the bottom of the wood portion of the heel, said rubber lift being provided with a nail guiding channel extending from the tread face into the body of the lift and substantially perpendicular to the bottom of the wooden portion of the heel with the rubber lift attached thereto, a supporting plate embedded in the rubber lift with a portion of the lift between the plate and the attaching face of the lift, said plate having an opening therethrough of non-circular shape aligned with the channel, and a nail having a shank and enlarged head and its end tapered to cause a meeting of only two opposite sides of the shank to form a cutting end edge, its other sides being substantially non-wedging, and its shank so shaped as to be only readily projected through such plate non-circular opening with its cutting edge disposed transversely to the grain of said wooden heel portion, said nail directed by the walls of the plate opening and driven through said rubber lift and into said heel wooden portion until the head of the nail rests on the plate to secure the rubber lift to the wooden heel portion by clamping a portion of the rubber lift against the contiguous wood portion flat surface.

3. In a woman's shoe heel, the combination of a main portion made of wood having a relatively small flat bottom, mounted upon a shoe with the grain of the wood running parallel to the longitudinal axis of the shoe, a rubber heel lift attached to the bottom of the wood portion of the heel, said rubber lift being provided with a nail guiding channel extending from the tread face into the body of the lift and approximately perpendicular to the bottom of the wooden portion of the heel with the rubber lift attached thereto, and a nail having a shank and enlarged head, and its end tapered to cause a meeting of only two opposite sides of the shank to form a cutting end edge, projected through the channel with its cutting edge disposed transversely to the grain of said wooden heel portion and driven through said rubber lift and into said heel wooden portion until the head of the nail secures the rubber lift to the wooden heel portion by clamping a portion of the rubber lift against the contiguous wood portion flat surface, the other sides of the nail shank adjacent its tapered end being so formed and disposed as to be substantially non-wedging in directions transverse to the grain of the wooden portion of the heel.

4. In a shoe heel, the combination of a main portion made of wood and arranged on the shoe with the grain of the wood extending parallel to the length of the shoe, a rubber heel lift having a concave attaching face and a tread face, and provided with an embedded washer having an opening extending therethrough and which opening forms part of a channel leading from the tread face to the interior of the lift, said rubber lift being arranged with its attaching face flattened on the bottom of the wooden portion of the heel, the contiguous faces of the lift and wooden portions being of similar outline, and a nail having opposite meeting sides forming a cutting edge at its end and having other adjacent substantial non-wedging sides disposed within the channel, the form of the channel and the form of the nail in transverse sections being such that the nail disposed within the channel and projected into the wooden heel portion will invariably be positioned to have its cutting edge substantially transverse to the grain of the wood.

In testimony whereof I have hereunto affixed my signature this 1st day of August, 1923.

CARL H. INGWER.